Patented May 18, 1926.

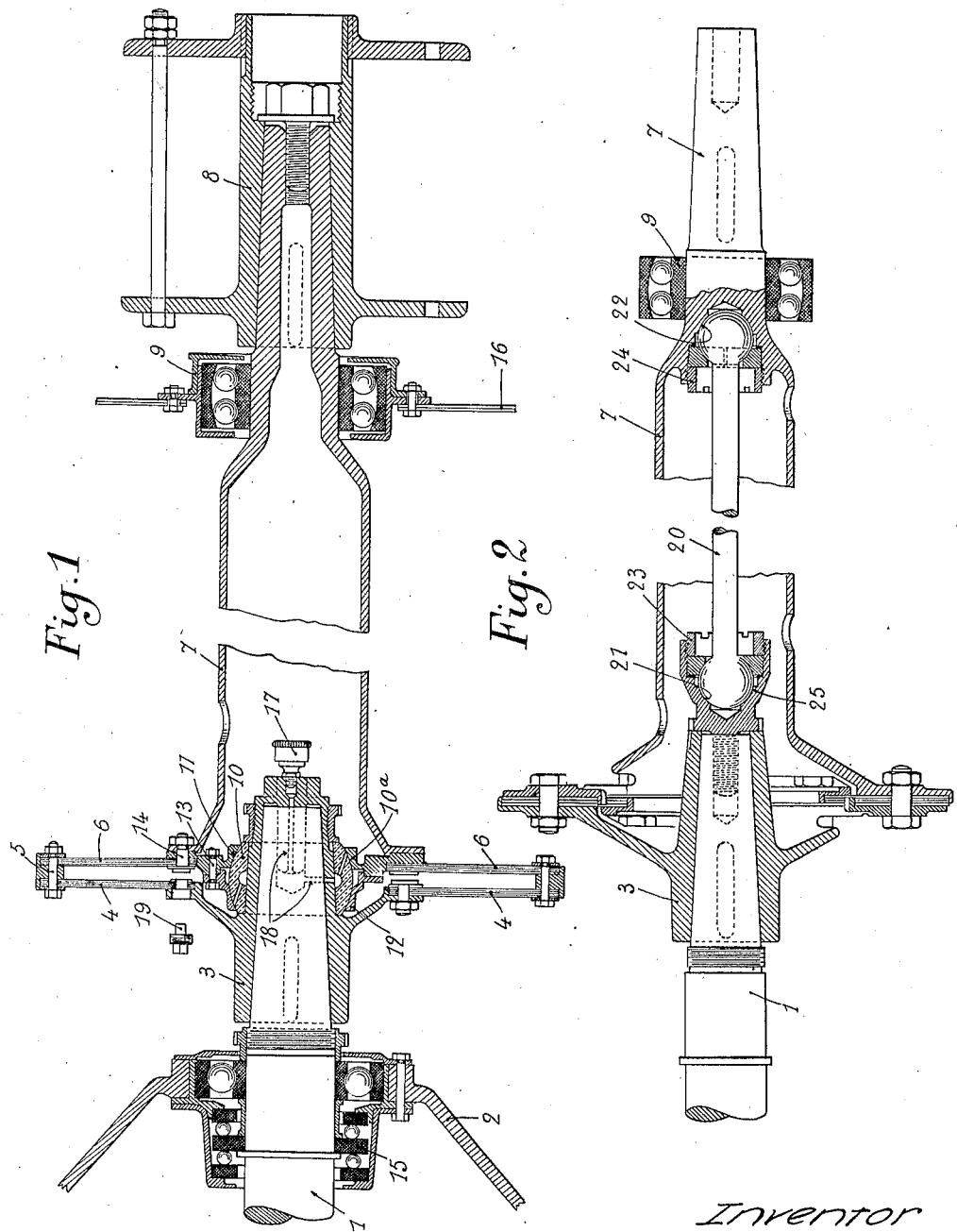

1,585,631

UNITED STATES PATENT OFFICE.

JEAN MARIE HEINRICH, OF PARIS, FRANCE, ASSIGNOR TO SOCIÉTÉ DES MOTEURS SALMSON (SYSTÈME CANTON-UNNÉ), OF PARIS, FRANCE.

EXTENSION ARRANGEMENT FOR THE PROPELLER SHAFTS OF AVIATION ENGINES.

Application filed November 25, 1924. Serial No. 752,217.

Propellers having a great penetrating power are in current use upon aeroplanes and other aircraft in order to obtain high speeds, but the maximum efficiency is only to be had when the propeller is disposed at a certain distance from the engine.

But in fact the frames and shafts which are specially designed in view of lightness are often found to be too short, so that the propeller must be mounted upon an extension of the engine shaft, said extension being carried by a support having the maximum lightness and being hence subject to bending. This bending occurs chiefly when the propeller has not been accurately centered, as well as when turning about, due to gyroscopic action. In spite of this bending, the problem is to transmit the power torque to the propeller and the tractive effort of the propeller to the engine. In a known arrangement for lengthening the shaft and for coupling the latter to its extension, universal joints are employed, but such joints have a tendency to vibrate and thus become rapidly deteriorated.

The present invention has for its object an extension arrangement for the driving shaft carrying the propeller in aircraft, in which the extension of the shaft upon which the propeller hub is mounted, is connected to the engine shaft on the one hand by an elastic coupling ensuring the elastic transmission of the power torque to the propeller, and on the other hand by a device comprising one or more rocking or swivel bearings and adapted for the positive transmission of the longitudinal reactions, said elastic coupling and bearing offering no opposition to the oscillations to which the whole apparatus may be subjected. According to the invention, the extension for the aircraft engine shaft comprises a sleeve adapted to fit upon the propeller receiving end of said shaft, a tubular member, one end of which has a shape similar to that of said receiving end, whereby the propeller hub may be mounted either upon said receiving end or upon said end of said tubular shaft, flexible means connecting said sleeve to said tubular member and a ball and socket connection adapted to transmit the axial reactions from the propeller to the engine shaft.

Said flexible means may be constituted by two sets of flexible discs suitably connected to each other and preferably provided with tight holding means in order to carry out the proper adjustment of the arrangement, as will be hereunder set forth.

In the appended drawings which are given by way of example:

Fig. 1 is a longitudinal axial section of an extension arrangement for the propeller shaft, according to the invention.

Fig. 2 is a like view of a modification.

In the construction shown in Fig. 1, 1 is the engine shaft which is maintained in the crank case 2; to the said shaft is keyed a sleeve 3 carrying a flexible disc 4, known per se, which consists of a flexible substance (or metal) in one or more plain or apertured sheets, the latter being either flat or tapered. The flexible disc 4 is connected by the bolts 5 to a like disc 6, the latter being secured to the shaft 7 serving as an extension for the shaft 1 and carrying the propeller hub 8. The said hub is so arranged that it can be mounted directly on the shaft 1, should it not be desired to utilize the shaft 7.

The weight of the extension 7 of the shaft, as well as the bending stresses, are supported by the swivel ball bearing 9. It will be observed that in the present device the power torque of the shaft 1 is imparted to the propeller through the medium of the flexible discs 4 and 6. But since the traction or thrust of the propeller is transmitted by the shaft 7, this will tend to vary the distance between the discs 4 and 6, and the elastic transmission afforded by the said discs would be rapidly put out of use.

In order to provide for an elastic transmission of the power torque to the propeller in the direction of the rotation while at the same time preventing the flexible discs to be torn off by the longitudinal stresses upon the shafts, and also enabling the device to assume the oscillations to which it is subjected, a ring 10 whose outer face has a hemispherical shape, is disposed upon the end of the shaft 1 or preferably upon a portion of the sleeve 3, said ring constituting a ball portion co-operating with the concave bearing shells 11 and 12 which are connected together by bolts 13; th shell 11 is further bolted at 14 to the shaft 7. By this arrangement, the longitudinal stresses are entirely transmitted to the shaft 1, and by the latter to the usual thrust bearing 15 of the engine. In this manner the support 16 of the front bearing 9 is not subjected to such longitudinal stresses, so that it may be of a light construction.

It should be noted that the ball portion 10 might be mounted with tight friction upon its seating on the sleeve 3 so as to serve as a hoop and thus participate in the efforts of adhesion of the said sleeve upon the end of the shaft 1. In view of the relative motion of the shells 11 and 12 upon the ring 10, proper lubrication of these parts is effected by means of a lubricator 17 and the ducts 18.

In order to reduce the oscillations of the said shaft extension to the minimum, the bearing 9 must be well centered in line with the engine shaft 1; the centering operation will be greatly facilitated by first rendering rigid the elastic coupling formed by the discs by means of a suitable number of screws 19 bearing upon the heads of the bolts 14. By slowly turning the shaft and loosening the bearing 9 on its support, it will be an easy matter to observe whether the said bearing is properly centered.

Fig. 2 shows a modified form of construction of the device according to the invention, and herein the motion of the shaft 1 is imparted to the shaft 7 which serves as an extension for the latter and carries the propeller hub, by means of an elastic coupling which may be constructed as in Fig. 1, or, as shown in Fig. 2, may be of another type, known per se. In the event the lengthwise stresses of the shaft 7 are directly transmitted to the shaft 1 by means of a shaft 20 whose ends are ball-shaped and co-operate with corresponding spherical recesses formed in the shaft 1 and the shaft 7 respectively at 21 and 22; nuts 23, 24 provided with hemispherical faces are caused to bear against the respective ball portions of the shaft 20, thus maintaining the latter in their recesses. Obviously, instead of forming the said recesses directly in the shaft, they may be formed in a separate member which is mounted thereon, as shown by way of example at 25.

The operation of the device shown in Fig. 2 is the same as in the case of Fig. 1, but in the modified device the elastic coupling transmiting the torque may be disposed outside of the plane of the bearing with greater facility. For the adjustment, the ball portions may be clamped in a fixed position by means of the nuts 23 and 24.

Obviously, the said arrangements are susceptible of various constructional modifications without departing from the spirit of the invention, and it is obvious that the device as hereinbefore set forth, although chiefly applicable to aviation engines, may be utilized for all other suitable power transmission purposes.

Having now described my invention, what I claim as new and desire to secure by Letters Patent is:

1. In combination with the propeller hub receiving end of an aircraft engine shaft, an extension for said shaft embodying a sleeve adapted to fit upon said receiving end, a tubular member, one end of which has a shape similar to that of said receiving end, whereby the propeller hub may be mounted either upon said receiving end or upon said end of said tubular member, flexible means connecting said sleeve to said tubular member and adapted to transmit the power torque to said tubular member, and a ball and socket connection between said sleeve and said tubular member and adapted to transmit the axial reactions to said engine shaft.

2. In combination with the propeller hub receiving end of an aircraft engine shaft, an extension for said shaft embodying a sleeve adapted to fit upon said receiving end, a tubular member, one end of which has a shape similar to that of said receiving end, whereby the propeller hub may be mounted either upon said receiving end or upon said end of said tubular member, two sets of annular flexible discs, secured together at their outer periphery and secured at their inner periphery to said sleeve and to said tubular member respectively, and adapted to transmit the power torque to said tubular member and a ball and socket connection between said sleeve and said tubular member and adapted to transmit the axial reactions to said engine shaft.

3. In combination with the propeller hub receiving end of an aircraft engine shaft, an extension for said shaft embodying a sleeve adapted to fit upon said receiving end, a tubular member, one end of which has a shape similar to that of said receiving end, whereby the propeller hub may be mounted either upon said receiving end or upon said end of said tubular member, two sets of annular flexible discs, secured together at their outer periphery and secured at their inner periphery to said sleeve and to said tubular member respectively, and adapted to transmit the power torque to said tubular member, a ball and socket connection between said sleeve and said tubular member and adapted to transmit the axial reactions to said engine shaft, means for rigidly and momentarily coupling said sets of discs to each other, and a swivel bearing for said extension adjacent said end of said tubular member.

4. In combination with the propeller hub receiving end of an aircraft engine shaft, an extension for said shaft embodying a sleeve adapted to fit upon said receiving end, a tubular member, one end of which has a shape similar to that of said receiving end, whereby the propeller hub may be mounted either upon said receiving end or upon said end of said tubular member, two sets of annular flexible discs, secured together at their outer periphery and secured at their inner periphery to said sleeve and to said tubular member respectively, and adapted to transmit the power torque to said tubular member, a ball and socket connection between said sleeve and said tubular member and adapted to transmit the axial reactions to said engine shaft, bolts screwed in the discs of one set and adapted to bear tightly upon the discs of the other set whereby the two sets of discs may be rigidly and momentarily coupled, and a swivel bearing for said extension adjacent said end of said tubular member.

In testimony whereof I have signed my name to this specification.

JEAN MARIE HEINRICH.